(12) United States Patent
Lewis

(10) Patent No.: US 10,451,302 B2
(45) Date of Patent: Oct. 22, 2019

(54) WEATHER ANTICIPATING PROGRAMMABLE THERMOSTAT AND WIRELESS NETWORK PTAC CONTROL

(71) Applicant: IoT Cloud Technologies Inc., Calgary (CA)

(72) Inventor: Matthew James Lewis, Calgary (CA)

(73) Assignee: IoT Cloud Technologies Inc., Calgary (CA)

( * ) Notice: Subject to any disclaimer, the term of this patent is extended or adjusted under 35 U.S.C. 154(b) by 133 days.

(21) Appl. No.: 15/686,883

(22) Filed: Aug. 25, 2017

(65) Prior Publication Data
US 2018/0058710 A1 Mar. 1, 2018

Related U.S. Application Data

(60) Provisional application No. 62/380,654, filed on Aug. 29, 2016, provisional application No. 62/399,397, (Continued)

(51) Int. Cl.
*F24F 11/00* (2018.01)
*G05B 19/048* (2006.01)
(Continued)

(52) U.S. Cl.
CPC .............. *F24F 11/30* (2018.01); *F24F 11/58* (2018.01); *F24F 11/62* (2018.01); *F24F 11/65* (2018.01);
(Continued)

(58) Field of Classification Search
CPC .................................................. F24F 2130/10
See application file for complete search history.

(56) References Cited

U.S. PATENT DOCUMENTS

| | | | | |
|---|---|---|---|---|
| 3,573,576 A | * | 4/1971 | Nakabo | G04C 23/26 307/38 |
| 8,224,768 B1 | * | 7/2012 | Crawford | G01W 1/10 702/2 |

(Continued)

FOREIGN PATENT DOCUMENTS

EP 980034 2/2000

OTHER PUBLICATIONS

Honeywell, "The Smart Choice is Honeywell", Outdoor Reset Controls, catalog, 50-1352 PM, Oct. 2009, (2 pages) www.forwardthinking.honeywell.com.
(Continued)

*Primary Examiner* — Mark A Connolly
(74) *Attorney, Agent, or Firm* — Kyle B Satterthwaite; Ryan W Dupuis; Ade & Company Inc.

(57) ABSTRACT

A computer-implemented method of controlling operation of a heating and air conditioning system, said method automatically obtaining current and forecasted weather data from one or more internet based meteorological HTTP web servers, automatically controlling operation of the heating and air conditioning system based on the current and forecasted weather data and a current indoor temperature of an indoor environment relative to a desired set point temperature for said indoor environment. Variable hysteresis ranges and temperature set points are adjusted not only on the basis of the weather data, but also on an occupancy status of the indoor environment. Embodiments include weather anticipating thermostats and Package Terminal Air Conditioner controllers interacting with Status Interface Alarm Control Update Servers.

19 Claims, 5 Drawing Sheets

Related U.S. Application Data filed on Sep. 24, 2016, provisional application No. 62/463,505, filed on Feb. 24, 2017.

(51) Int. Cl.

| | | |
|---|---|---|
| *F24F 11/30* | (2018.01) | |
| *F24F 11/58* | (2018.01) | |
| *F24F 11/62* | (2018.01) | |
| *F24F 11/65* | (2018.01) | |
| *G05B 15/02* | (2006.01) | |
| *F24F 110/12* | (2018.01) | |
| *F24F 120/12* | (2018.01) | |
| *F24F 120/10* | (2018.01) | |
| *F24F 130/10* | (2018.01) | |
| *F24F 110/10* | (2018.01) | |
| *F24F 130/00* | (2018.01) | |

(52) U.S. Cl.
CPC ........... *G05B 15/02* (2013.01); *G05B 19/048* (2013.01); *F24F 2110/10* (2018.01); *F24F 2110/12* (2018.01); *F24F 2120/10* (2018.01); *F24F 2120/12* (2018.01); *F24F 2130/00* (2018.01); *F24F 2130/10* (2018.01); *G05B 2219/25168* (2013.01); *G05B 2219/2614* (2013.01)

(56) References Cited

U.S. PATENT DOCUMENTS

| | | | | |
|---|---|---|---|---|
| 8,851,393 | B1 | 10/2014 | Girgis | |
| 9,696,055 | B1* | 7/2017 | Goodman | .......... G05D 23/1932 |
| 2009/0050703 | A1 | 2/2009 | Lifson et al. | |
| 2012/0259470 | A1 | 10/2012 | Nijhawan et al. | |
| 2013/0103204 | A1* | 4/2013 | Stefanski | ........... G05D 23/1902 |
| | | | | 700/276 |
| 2013/0133404 | A1 | 5/2013 | Patel et al. | |
| 2015/0134124 | A1 | 5/2015 | Carter et al. | |
| 2015/0145677 | A1 | 5/2015 | Smith, Jr. | |
| 2015/0159893 | A1 | 6/2015 | Daubman et al. | |
| 2015/0167989 | A1* | 6/2015 | Matsuoka | ............... F24D 19/10 |
| | | | | 700/276 |
| 2016/0018832 | A1* | 1/2016 | Frank | .................... H04W 4/021 |
| | | | | 700/276 |
| 2016/0201933 | A1* | 7/2016 | Hester | ................. F24D 19/1084 |
| | | | | 700/276 |
| 2017/0054571 | A1* | 2/2017 | Kitchen | ............. H04L 12/2818 |

OTHER PUBLICATIONS

Honeywell, "Aquatrol Electronic Controls for Hydronic Heating", catalog, 63-9686 PR Jan. 2010, (12 pages) www.honeywell.com.

Honeywell, "Sola Hydronic Control", catalog, 63-9725 PR, Nov. 2010, (8 pages) www.honeywell.com.

Cooperman, Alissa; Dieckmann, John and Brodrick, James, "Using Weather Data for Predictive Control", article, Ashrae Journal, Dec. 2010, American Society of Heating Refrigerating and Air Conditioning Engineers, Inc., www.ashrae.org.

Friedrich, Uwe, "Projektinfo 14/2011 Detailed Information on Energy Research", brochure, BINE Information Service, kontakt@bine.info; www.bine.info.

O'Boyle, Britta, "Tado Smart Thermostat Review", article, Aug. 8, 2014, www.picket-line.com/review/129799-tado-smart-thermostat-review.

White-Rodgers, Indoor—Outdoor Hot Water Temperature Control with Adjustable Reset Ratio Installation Instructions, Part No. 37-1640B.

\* cited by examiner

WEATHER ANTICIPATING PROGRAMMABLE THERMOSTAT AND WIRELESS NETWORK PTAC CONTROL

CROSS REFERENCE TO RELATED APPLICATIONS

This application claims benefit under 35 U.S.C. 119(e) of Provisional Application Ser. No. 62/380,654, filed Aug. 29, 2016; Provisional Application Ser. No. 62/399,397, filed Sep. 24, 2016; and Provisional Application Ser. No. 62/463,505, filed Feb. 24, 2017; each of which is incorporated herein by reference in its entirety.

BACKGROUND

Most thermostats automatically turn on the heat when the room or zone temperature drops below the heating set point and then start the air conditioning when the room or zone temperature exceeds the cooling set point.

During the early morning hours if the room or zone temperature drops below the heating set point heat will be turned on regardless of current or upcoming outdoor weather conditions. Likewise in the late afternoon if the room or zone temperature exceeds the cooling set point the thermostat starts the air conditioning regardless of current or upcoming outdoor weather conditions. This could result in heating in the morning and then air conditioning a couple hours later or air conditioning in the late afternoon and heating a couple hours later.

Similar shortcomings exist with conventional Packaged Terminal Air Conditioners. A Packaged Terminal Air Conditioner (abbreviated as PTAC) is a type of self-contained heating and air conditioning system commonly used in hospitals, hotels, motels, senior housing facilities, condominiums, apartment buildings, schools and student dormitories. Most PTACs are used to heat or cool a single room using only electric heaters and or heat pumps for heating. Some PTACs are cooling only. Other PTACs are equipped with hydronic heating coils or natural gas heating.

Typically the PTAC is connected to a wall thermostat with switches. The switches control the heating or cooling mode of operation and the fan settings. During warm weather someone in the room must switch the thermostat to cooling mode for the cooling to work. Once the cooling mode is selected the cooling will be automatically controlled by the thermostat temperature set point. When the outside temperature gets cold someone in the room must switch the thermostat to heating mode and the heating will be automatically controlled by the thermostat temperature set point. If the days are hot and the nights are cool then someone will needs to switch the thermostat to heating at night and back to cooling as the room gets hot during the day. This constant switching of the thermostat results in damage to the thermostat and wasted energy by manually switching between cooling and heating.

SUMMARY OF INVENTION

According to one aspect of the invention, there is provided a heating and air conditioning control system comprising:

a microcomputer-based unit with a wireless transceiver, outputs connected or connectable to a heating and air conditioning system to control operation thereof, including switching thereof between heating and cooling modes, and an input connected to a temperature transducer to measure a current indoor temperature in an indoor environment in which temperature is to be controlled by operation of said heating and air conditioning system;

an internet access point; and one or more internet based meteorological HTTP web servers that provide current and forecasted weather data, wherein the microcomputer-based unit is configured to, automatically control operation of the heating and air conditioning system based on the current and forecasted weather data and the current indoor temperature relative to a desired set point temperatures for said indoor environment.

In one embodiment, the microcomputer-based unit, which may be a Weather Anticipating Programmable Thermostat or Package Terminal Air Conditioning (PTAC) controller, uses meteorological data obtained through the internet to determine the upcoming heating or cooling requirements. The Weather Anticipating Programmable Thermostat controls the heating and cooling based on desired set points, actual room temperature and current and/or anticipated weather conditions.

As an example in a system with heating and air conditioning, if in the early morning the room or zone temperature drops below the desired heating set point and according to the current weather forecast it is going to get hot, the Weather Anticipating Programmable Thermostat will avoid heating unless absolutely needed. Likewise in the late afternoon if the room or zone temperature exceeds the cooling set point and the outside weather conditions are about to get cooler the Weather Anticipating Programmable Thermostat will avoid running the air conditioning unless absolutely needed.

According to another aspect of the invention, there is provided a computer-implemented method of controlling operation of a heating and air conditioning system, said method automatically obtaining current and forecasted weather data from one or more Internet based meteorological HTTP based web servers, automatically controlling operation of the heating and air conditioning system based on the current and forecasted weather data and a current indoor temperature of an indoor environment relative to a desired set point temperature for said indoor environment.

According to yet another aspect of the invention, there is provided a packaged terminal air conditioner control system comprising:

a. plurality packaged terminal air conditioners,
b. computer control system connected to each said packaged terminal air conditioner,
c. temperature transducer coupled to each said computer control system,
d. wireless network transceiver coupled to each said computer control system,
e. wireless internet access point connecting said wireless network transceiver,
f. internet server that interfaces with said computer control systems through said wireless internet access point,
g. meteorological web server that provides current weather conditions and weather forecast data to the said server.

In one embodiment, the system further comprises an interface to the key card access system that provides room occupancy status data that is used to control the operation and temperature settings of the said packaged terminal air conditioner.

In one embodiment, the system further comprises an interface to the front desk registration system that provides room occupancy status data that is used to control the operation and temperature settings of the said packaged terminal air conditioner.

Another aspect of the invention relates to a method controlling the heating cooling changeover operation of a plurality of packaged terminal air conditioners based on current weather and weather forecast information obtained through the internet.

Another aspect of the invention relates to a method of controlling the peak energy demand of a plurality of packaged terminal air conditioners through a wireless network connected to an internet based cloud server.

Another aspect of the invention relates to a method of staging of a plurality of packaged terminal air conditioners through a wireless network connected to an internet based cloud server.

Another aspect of the invention relates to a method of monitoring of a plurality of packaged terminal air conditioners through a wireless network connected to an internet based cloud server.

Another aspect of the invention relates to a method of detecting and alarming low or high temperatures conditions in rooms with packaged terminal air conditioners through a wireless network connected to an internet based cloud server.

Another aspect of the invention relates to a method of controlling the operation of a plurality of packaged terminal air conditioners based on anticipated demand determined by local weather forecast data.

DESCRIPTION OF DRAWINGS

Preferred embodiments of the invention will now be described in conjunction with the accompanying drawings in which.

DESCRIPTION

Figure 1:
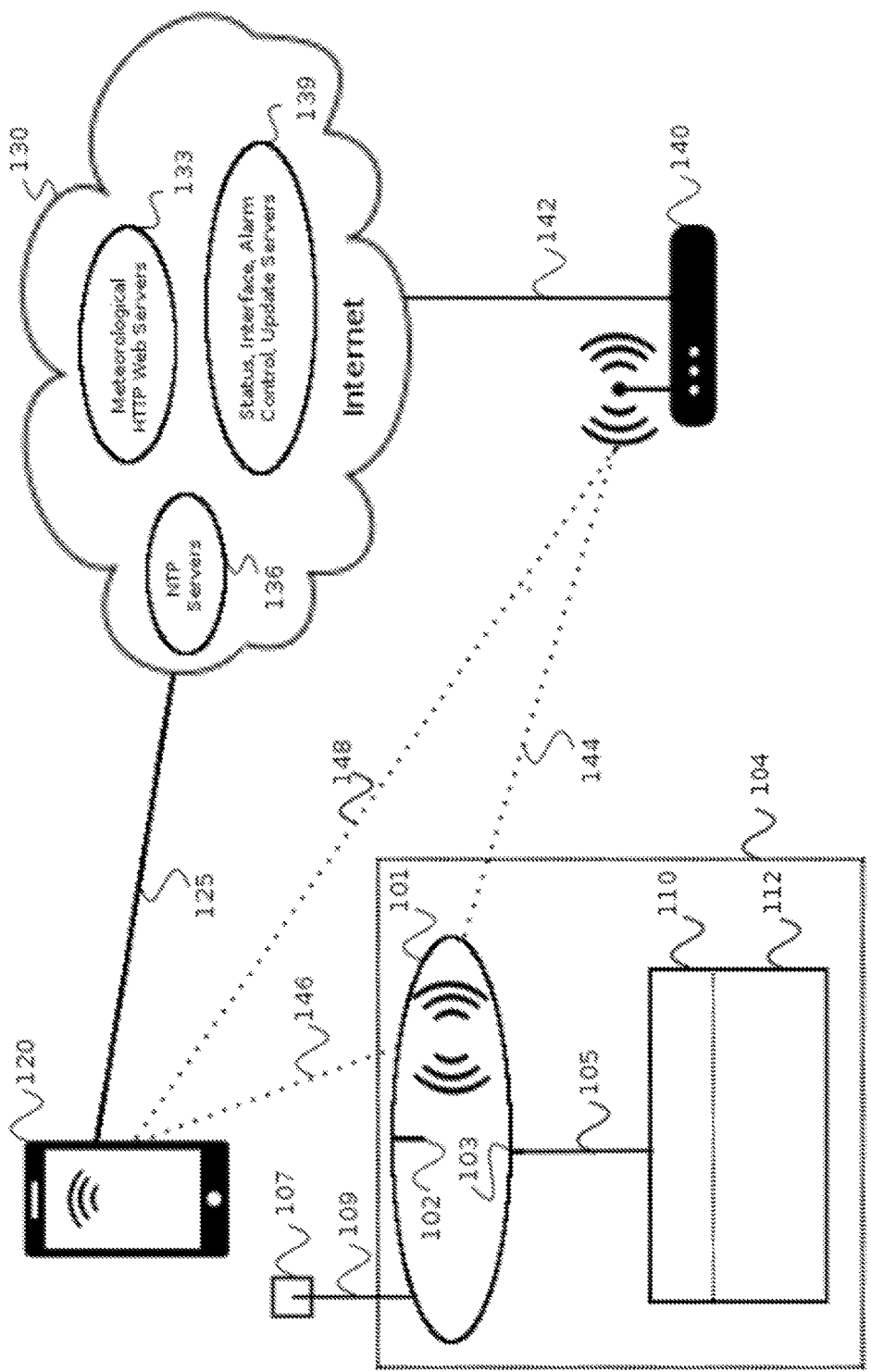
FIG. 1 is a simplified schematic diagram illustrating a first embodiment of the present invention, in which a Weather Anticipating Programmable Thermostat is employed control a heating and air conditioning system.

A first embodiment of the present invention features a Weather Anticipating Programmable Thermostat that uses meteorological data obtained through the internet to determine the upcoming heating or cooling requirements. The Weather Anticipating Programmable Thermostat controls the heating and cooling based on desired set point, actual room temperature and current and anticipated weather conditions. Though described herein mainly in the context of a combined heating and air conditioning system operable in both heating and cooling modes, the same Weather Anticipating Programmable Thermostat also works with "heating only" systems that lack a separate cooling function, and air conditioning only systems that lack a heating function.

The Weather Anticipating Programmable Thermostat contains a microcomputer system, input output interface and wireless transceiver. The microcomputer system includes a microprocessor, and non-transitory computer readable memory in the form of SRAM, and FLASH/EEPROM memory. The input output interface includes the power supply, NC and NO dry contacts and transducer inputs. The NC and NO dry contacts are used to interface with heating and cooling systems. The transducer inputs interface with a local room or zone temperature sensor for measuring a current room/zone temperature within an indoor environment that is heated and cooled by the heating and air conditioning system.

The Weather Anticipating Programmable Thermostat interfaces with all types of heating systems, HVAC systems, boilers, pumps, air conditioning systems and zoned systems that are designed to operate from a common thermostat. Such connections by which a computerized thermostat is interfaced with the components of a heating and air conditioning system are well known in the art, and thus not specifically described herein in greater detail.

The transceiver within the Weather Anticipating Programmable Thermostat may use any of the various Wi-Fi IEEE 802.11 wireless specifications for communications.

Settings within the Weather Anticipating Programmable Thermostat are programmed into the FLASH/EEPROM memory through a wireless enabled device. The wireless enabled devices include, a cell phone, tablet, laptop or desktop computer. The programmed settings include desired heating and cooling set points and 7 day time scheduled set points.

The Weather Anticipating Programmable Thermostat connects to the internet through a wireless access point. Via the wireless access point, the Weather Anticipating Programmable Thermostat obtains current local weather and weather forecast data from internet based meteorological servers, and obtains current local time and date from internet based NTP (Network Time Protocol) servers.

The Weather Anticipating Programmable Thermostat status and set points can be accessed through the internet, for example using any internet capable device (e.g. cell phone, tablet, laptop or desktop computer) to access one more status, interface, update servers, which may for example be cloud based. Software updates for the Weather Anticipating Programmable Thermostat are downloaded through the internet from said cloud based status, interface update servers.

With reference to FIG. 1, the Weather Anticipating Programmable Thermostat 101 connects to the Heating Air Conditioning System Controller 110 through wired connection 105. Temperature Set Points are programmed into the Weather Anticipating Programmable Thermostat 101 by an authorized user through the wireless network enabled device 120. The Weather Anticipating Programmable Thermostat 101 connects to the Internet Cloud through a wireless connection 144, Internet Access Point Router 140 and the Broadband Internet connection 142. The Status Interface Alarm Control Update Servers 139 communicate with the Weather Anticipating Programmable Thermostat 101.

In one embodiment the Weather Anticipating Programmable Thermostat 101 is mounted on the wall with an internal room/zone temperature transducer 102 and interfaces through connector 103 with the Heating Air Conditioning System 110 using dry contacts.

With reference to FIG. 1, in another embodiment the Weather Anticipating Programmable Thermostat 101 is connected to an external room/zone temperature transducer 107 through connector 109 and connector 103, 105 interfaces with the Heating Air Conditioning System Controller 110 using dry contacts, modulated voltage or current signals.

In another embodiment the Weather Anticipating Programmable Thermostat 101 and the Heating Air Conditioning System Controller 110 are combined and installed within the Heating Air Conditioning System 104 with an external room/zone temperature transducer 107. The Weather Anticipating Programmable Thermostat 101 and Heating Air Conditioning System Controller 110 form a Combination Controller 101+110 that interfaces with the fan motor and heating and air conditioning system 112 through dry contacts, temperature transducers, pressure switches, pressure transducers, stepping motors, modulated voltage or current signals, to directly control the operation of the fan, compressor, heaters, valves and dampers.

Settings are entered into the Weather Anticipating Programmable Thermostat 101 through the Wi-Fi enabled device 120 directly 146 or 148, 140, 144 or through the Status Interface Alarm Control Update Servers 139 through cellular data network 125 or WiFi network 148, 140, 142. The Status Interface Alarm Control Update Servers 139 are preferably cloud based, and interface with other cloud servers including the NTP Servers 136 and Meteorological Servers 133. The NTP Servers 136 provide local time and date. The Status Interface Alarm Control Update Servers 139 download and process multiple http and https based webpages containing current weather data and forecasted weather data from Meteorological Servers 133.

The Status Interface Alarm Control Update Servers 139 may select the most accurate weather data to be used by the Weather Anticipating Programmable Thermostat 101. To assess accuracy, The Status Interface Alarm Control Update Servers 139 obtain respective sets of weather data from the different meteorological servers, and then compare these data sets against one another in order to filter out any current and forecasted weather data that differ notably from the other data sets, essentially using this anomaly as a sign that the notably different forecast is inaccurate, and thus unreliable for use by the system. The current and forecasted weather data used by the system is thus selected from only the remaining, higher-accuracy data sets remaining after the filtering step.

Should connection to one of the Meteorological Servers 133 fail the Status Interface Alarm Control Update Servers 139 will automatically switch to an alternative Meteorological Server 133. Retrieving the meteorological data from existing third party meteorological HTTP web servers 133 provides the system with universality and cost efficiency, allowing it to operate in any geographic region within which meteorological data is measured and posted online on publicly accessible web pages. No specialized communication protocols are required to interact with government weather bureaus or other non-HTTP resources. It also provides the aforementioned redundancies whereby failure of one meteorological service allows the system to continue operating by using an alternate meteorological service.

Should the Weather Anticipating Programmable Thermostat 101 loose connection to the internet, the Weather Anticipating Programmable Thermostat 101 will switch to fail safe mode. During fail safe mode the Weather Anticipating Programmable Thermostat 101 will maintain temperatures based on predetermined settings stored within the memory of the thermostat's microcomputer. These predetermined failsafe settings, at minimum, preferably include a default set point temperature near which the indoor environment is to be maintained during fail safe operation.

Should the Heating Air Conditioning System malfunction, the Weather Anticipating Programmable Thermostat 101 will send alarm signals to the Status Interface Alarm Control Update Servers 139. When the Status Interface Alarm Control Update Servers 139 receive an alarm signal, they generates an alarm notification. Alarm notifications are sent by email or SMS text messages to one more authorized users, who then, whether themselves, or through a representative or third party service, may initiate investigation of the problem, whether remotely or on site, and then take appropriate corrective action (e.g. equipment service, repair or replacement).

After installation, the Weather Anticipating Programmable Thermostat 101 initially operates in safe mode and is programmed directly by the Wi-Fi enabled device 120, whereby the authorized user can program one more desirable set point temperatures (i.e. desired indoor air temperature for the room/zone concerned), and a scheduled timeframe at which each such set point temperature is to be applied. The set point temperatures may include different set point temperatures for heating and cooling modes. However, because the Weather Anticipating Programmable Thermostat 101 is capable of switching the heating and air conditioning system between heating and cooling modes automatically, the stored set points may alternatively be independent of a particular operating mode of the heating and cooling system, and instead be correlated only with the particular timeframes assigned to the different set points. The thermostat will automatically switch the heating and air conditioning system between heating and cooling mode according to weather, forecast data and the current room/zone temperature relative to the currently scheduled set point.

The safe mode direct connection 146 allows the Weather Anticipating Programmable Thermostat 101 to be configured directly through 146 or Internet Access Point Router 140. Once the Weather Anticipating Programmable Thermostat 101 establishes connection to the Internet Cloud 130, it connects to the Status Interface Alarm Control Update Servers 139. Settings, temperature readings and updates are exchanged between the Weather Anticipating Programmable Thermostat 101 and the Status Interface Alarm Control Update Servers 139.

Once connected to the Internet Cloud, the Weather Anticipating Programmable Thermostat 101 can be monitored, programmed and controlled through the Wi-Fi enabled device either locally through the Status Interface Alarm Control Update Servers 139 with local connection 144 or remote connection 125.

Having outlined the general layout and setup of the system and the functions of the cooperating components thereof, attention is now turned to the operation of the system.

The Status Interface Alarm Control Update Servers 139 obtain current and forecasted weather data from the meteorological cloud servers 133, and also obtain the current room/zone temperature from the Weather Anticipating Programmable Thermostat 101. Additionally, the Status Interface Alarm Control Update Servers 139 have possession of the currently assigned set point temperature, for example as initially dictated by the set point schedule programmed into the Weather Anticipating Programmable Thermostat 101 during initial safe mode setup, and subsequently forwarded therefrom for storage of the scheduled set point values by the Status Interface Alarm Control Update Servers 139.

The Status Interface Alarm Control Update Servers 139 use the current room/zone temperature, and currently assigned set points, and the current and forecasted weather data to determine the mode of operation and current and upcoming heating or cooling requirements.

Like a conventional heating/cooling thermostat, the Weather Anticipating Programmable Thermostat 101 is not designed to maintain an exact temperature because this would require switching on and off the heating or cooling several times a minute. To prevent rapid switching on and off, thermostats use a hysteresis range, which denotes the difference between the temperatures at which the thermostat cycles the cooling or heating on and off. In cooling mode, the heating/cooling system is deactivated once the room temperature reaches the lower limit of the hysteresis range, and is only reactivated if the room temperature rises back up over the upper limit of the hysteresis range. In heating mode, the heating/cooling system is deactivated once the room temperature reaches the upper limit of the hysteresis range, and only activated again if the room temperature falls back below the lower limit of the hysteresis range. The hysteresis range falls around the targeted set point temperature for the room, zone or other indoor environment concerned.

The Weather Anticipating Programmable Thermostat 101 uses a variable hysteresis range and offsets the set point temperature depending on current and forecasted weather conditions and other factors. The variable hysteresis range and set point adjustments may be calculated locally on the thermostat based on data from the cloud server, or may be calculated by the cloud server and transmitted to the thermostat.

The hysteresis range and set point temperature are adjusted by one or more of the following factors: (a) difference between the current outdoor temperature and set point room temperature, (b) difference between the forecasted outdoor temperature and set point room temperature, (c) past outdoor temperature records with the amount of time the heating system was required to remain on to achieve desired set point, and the temperature overshoot after the heating system was turned off, and (d) past outdoor temperature records with the amount of time the cooling system was required to remain on to achieve desired set point, and the temperature overshoot after the cooling system was turned off.

The wider the difference between the outdoor temperature and the desired room temperature (i.e. the set point temperature), the tighter the hysteresis range assigned by the thermostat 101. During very cold outside weather conditions, the hysteresis range is shortened because it requires a longer heating cycle to heat the room. During very hot outside weather conditions, the hysteresis range is shortened because it requires a longer cooling cycle to cool the room. When the outside temperature is close to the desired room temperature, then the cooling or heating hysteresis range is widened.

During initial start-up of the system, e.g. when first powered on after installation, or after a power outage or interruption, and at regular intervals during normal ongoing operation of the system, the Weather Anticipating Programmable Thermostat 101 communicates with the cloud server to send the current status of the Weather Anticipating Programmable Thermostat 101 to the cloud server and to request updates from the cloud servers. The thermostat status and updates include one or more of the following (a) current outside weather data obtained from the meteorological server by the cloud server, (b) current indoor temperature obtained by the thermostat from the indoor temperature transducer, (c) current indoor relative humidity obtained by an optional humidity transducer, (d) weather forecast data obtained from the meteorological server by the cloud server, (e) temperature set points, (f) hysteresis ranges, (d) current time and date obtained from the NTP server by the cloud server, (e) cooling cycle run time, (f) heating cycle run time, and (g) updates to system software.

In relation to use of the weather data to control operation of the heating and cooling system, the following examples are presented.

The thermostat or cloud server compares the current indoor air temperature from the temperature transducer with the latest current outdoor temperature received from the cloud server, and sets the current hysteresis range based at least partly on the measured difference between the current indoor air temperature and the current outdoor temperature, setting a narrower hysteresis range for a larger indoor/outdoor temperature difference or a wider hysteresis range for a smaller indoor/outdoor temperature difference.

Figure 3:
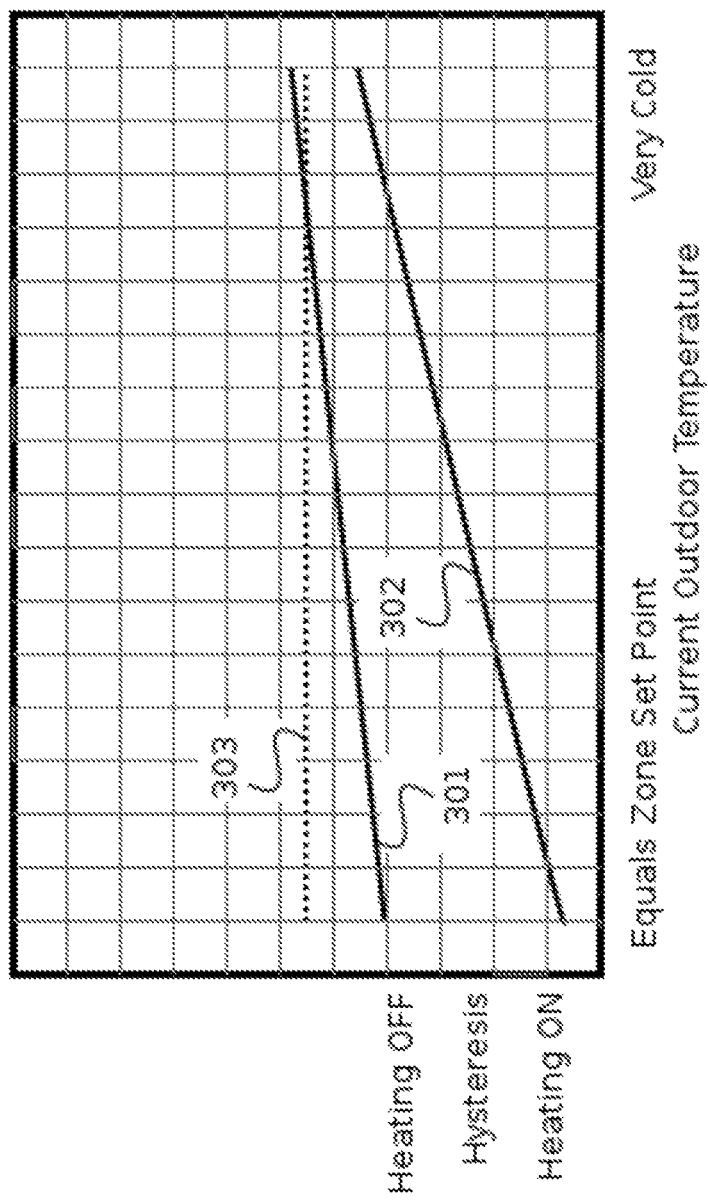
FIG. 3 illustrates heating hysteresis control using the system of either FIG. 1 or FIG. 2.

FIG. 3 illustrates the heating hysteresis control. 301 is the heating turn OFF and 302 is the turn ON. During mild outdoor temperatures the hysteresis is widened and the OFF is below the desired room temperature 303. As the outside gets colder the ON/OFF hysteresis is automatically narrowed by the weather anticipating programmable thermostat.

Figure 4:
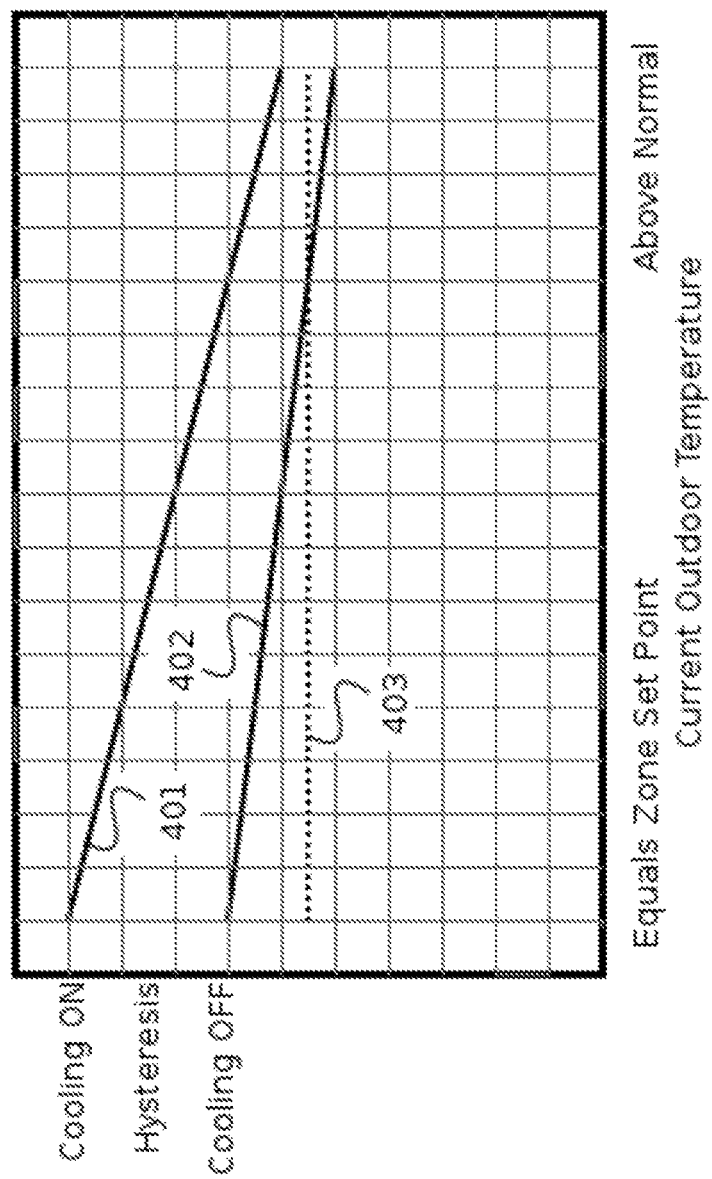
FIG. 4 illustrates cooling hysteresis control using the system of either FIG. 1 or FIG. 2.

FIG. 4 illustrates the cooling hysteresis control. 402 is the cooling turn OFF and 401 is the turn ON. During cool outdoor temperatures the hysteresis is widened and the OFF is above the desired room temperature 402. As the outside gets hotter the ON/OFF hysteresis is automatically narrowed by the weather anticipating programmable thermostat.

The hysteresis control is only used in systems with ON/OFF controls. In heating or cooling systems heating systems with modulated control valves, modulated SCR controllers or VFDs the weather anticipating programmable thermostat sends modulated voltage or current signals to the respective heating or cooling controls using PID algorithms to control the room/zone temperature.

The inclusion of current weather conditions in the retrieved weather data from the meteorological server also serves another notable purpose. Particularly when the current outside temperature is below freezing, detection of a room/zone air temperature that is below a predetermined low temperature alarm threshold will cause the Status Interface Alarm Control Update Servers 139 to send an alarm to the user(s), for example by way of email or SMS text message. In response to the alarm, the user can investigate potential malfunction of the heating system before freeze related damage (e.g. burst plumbing pipes) can occur in the indoor environment. Accordingly, detection of a current outdoor temperature below freezing may be used to trigger monitoring of the room temperature against the predetermined low temperature alarm threshold.

Likewise, detection of a room/zone air temperature or humidity is above a predetermined alarm threshold will cause the Status Interface Alarm Control Update Servers 139 to send an alarm to the user(s), for example by way of email or SMS text message. In response to the alarm, the user can investigate potential malfunction of the heating or cooling system.

Figure 5:
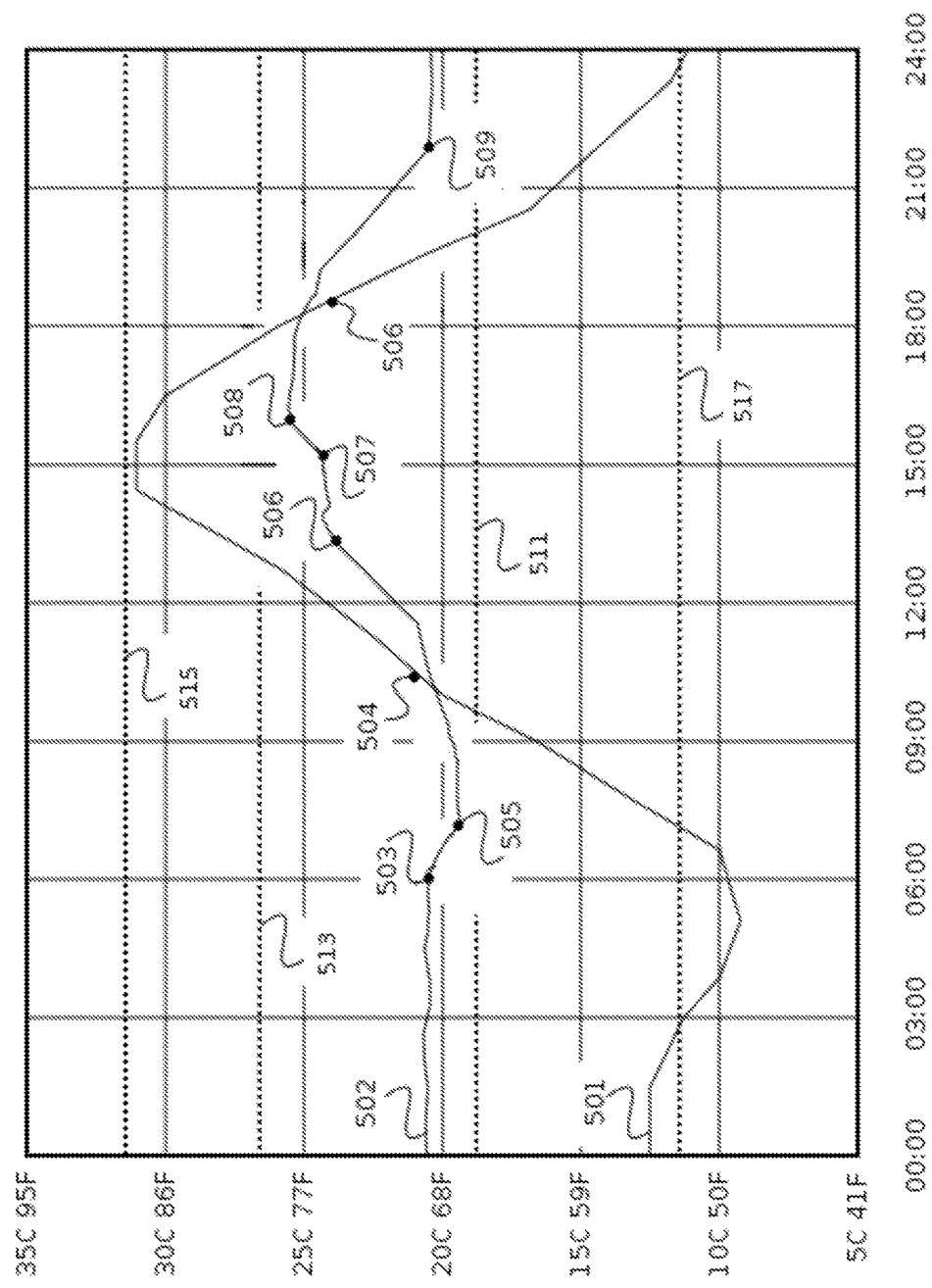
FIG. 5 illustrates an example operation of the weather anticipating programmable thermostat over a 24-hour period.

Also based on the comparison of the current indoor air temperature against the forecast outdoor temperature, the Weather Anticipating Programmable Thermostat automatically sets the heating/cooling system into its heating or cooling mode according to where the forecasted outdoor temperature relative to the heating and cooling room/zone set points. FIG. 5 illustrates an example operation of the weather anticipating programmable thermostat over 24 HR. This example overlays the weather forecasted temperature data 501 with the room/zone temperature data 502. Note: Night or unoccupied setback is not included in this example. At 00:00 the system is in heating mode as the outside temperature is below the room/zone temperature set point of 69 F/20.5 C and the room/zone temperature is maintained around this temperature. At around 06:00 the weather anticipating programmable thermostat goes into heating energy conservation mode and lowers the set point 503 because the weather forecast indicates that the outside temperature will be above the set point 504. The room/zone temperature drops to the lower set point 505 and then the heating is activated to maintain the room/zone temperature. Once the actual outside temperature rises above the room/zone temperature set point the system is automatically switched to cooling mode. The room/zone temperature rises to the cooling set point of just below 25 C/77 F and the cooling is activated 506. At around 15:00 the weather anticipating programmable thermostat goes into cooling energy conservation mode and raises the set point 507 because the weather forecast indicates that the outside temperature will be below the set point 506. The room/zone temperature rises to the higher set point 508 and then the cooling is activated to maintain the room/zone temperature. Once the actual outside temperature drops below the room/zone temperature set point the system is automatically switched to heating mode and the room/zone temperature is maintained at the heating set point 509. The weather anticipating programmable thermostat calculates the amount of time for heating and cooling energy conservation modes by recording the temperatures during previous energy conservation modes. In this example the heating energy conservation mode was activated at 503 about 4.5 HR before the anticipated rise in outdoor temperature from the weather forecast data 504. In order to minimize discomfort caused by the heating being lowered 505 below the set point the next heating energy conservation mode cycle would be shortened so that lower room/zone temperature 505 occurs around 09:00. Likewise to minimize discomfort caused by the room temperature rising above cooling set point 506 the next cooling energy conservation mode cycle would be shortened so that higher room/zone temperature 508 occurs around 17:00. Should the room/zone temperature drop below the minimum cooling/heating changeover setting 511 the system is switched to heating mode, likewise should the room/zone temperature go above the maximum changeover set point 513 the system is switched to cooling mode. Should the room/zone temperature exceed 515 or drop below 517 an alarm signal is sent to the Status Interface Alarm Control Update Servers.

The hysteresis range can be fine-tuned if historical data recorded by the cloud server includes a record of a prior instance of similar temperature conditions. Each stored historical record preferably includes the current outdoor temperature from said prior instance, the set point temperature from said prior instance, an amount of run time the heating/cooling system was operated before shutting off during said instance, and the room temperature achieved after said shut off. It is know that heating mode operation of the heating/cooling system can sometimes notably "overshoot" the set point temperature, as remnant heat in the system continues to emanate within the indoor environment after shut off of the heating system. So, if an automated search of the historical data reveals a record of a prior instance of comparable indoor, outdoor and set point temperatures to the current instance, detection that the prior instance experienced notable overshoot can be used to avoid similar production of excess heat in the given instance by reducing the upper limit of the current hysteresis range so that the heating mode shuts off earlier to try and prevent similar overshoot of the set point temperature. Overshoot can also occur in cooling mode, where the air is cooled below the desired set-point, and can likewise be mitigated or overcome by increasing the temperature value of the lower limit of the hysteresis range.

On a very cold day, the overshoot after the heating is turned off is less than when the outdoor temperature is just below the indoor temperature, as the rate of heat loss from the indoor environment to the outside environment is notably greater. Likewise, as another example, on a very hot day the overshoot after the cooling is turned off is less than when the outdoor temperature is just above the indoor temperature.

The Weather Anticipating Programmable Thermostat or Status Interface Alarm Control Update Servers also compares the anticipated outdoor temperature against the current outdoor air temperature and the current indoor air set points to assess whether anticipated weather changes outweigh the current need to heat or cool the indoor environment. If the anticipated outdoor temperature differs from the present outdoor temperature by more than a predetermined amount, thereby denoting an significant upcoming change in outdoor temperature, above the heating set point or below the cooling set point the respective heating or cooling set points are adjusted to a predetermined energy conservation set point. For example, if the currently assigned heating set point is above the current indoor temperature, thereby denoting a need to heat the indoor environment and the anticipated outdoor temperature is going to be notably higher than both the present outdoor temperature and the currently assigned heating set point, then the heating set point is lowered to the cooling energy conservation set point, as the anticipated high outdoor temperatures will naturally warm the indoor environment. Likewise, if the currently assigned cooling set point is below the current indoor temperature, thereby denoting a need to cool the indoor environment and the anticipated outdoor temperature is notably lower than both the present outdoor temperature and the currently assigned cooling set point, then the cooling set point is raised to the cooling energy conservation set point, as the anticipated cold outdoor temperatures will naturally cool the indoor environment.

Figure 2:
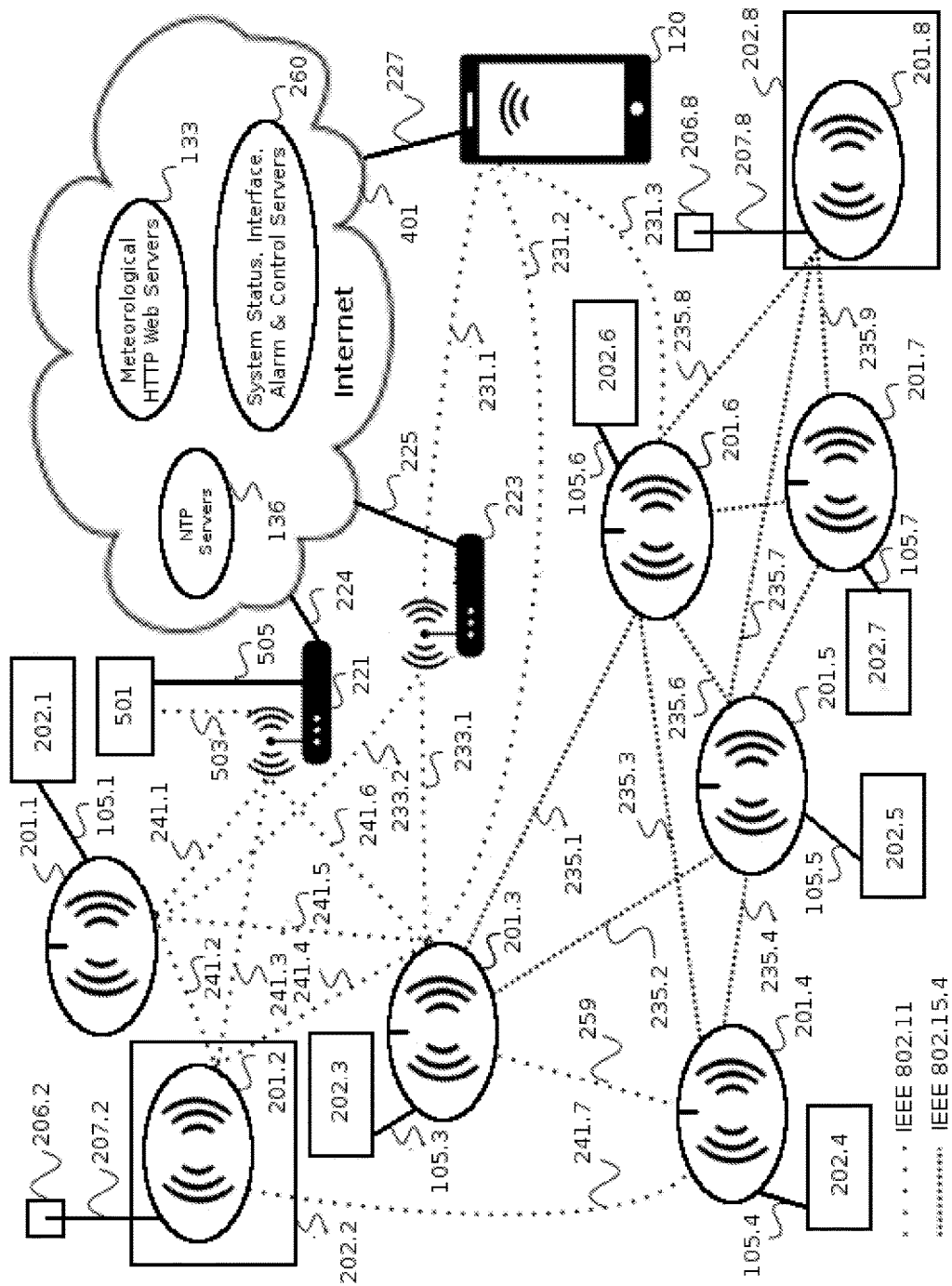
FIG. 2 is a simplified schematic diagram illustrating a second embodiment of the present invention, in which a set of microcomputer based PTAC Weather Anticipating Programmable Controllers operating a plurality of PTACs make use of weather data from one or more meteorological servers.

Whereas FIG. 1 illustrates a single-dwelling or single-room/zone application where a singular Weather Anticipating Programmable Thermostat controls a singular heating and cooling system, FIG. 2 illustrates another embodiment featuring several Packaged Terminal Air Conditioners (PTAC) system controllers 202.1, 3, 4, 5, 6, 7 connected directly to PTAC Weather Anticipating Programmable Controllers 201.1 3, 4, 5, 6, 7 that incorporate internal temperature transducers therein, and the PTAC Weather Anticipating Programmable Controller 201.2, 8 are directly installed within the PTAC system controllers 202.2, 8 and connect through 207.2, 8 to external temperature transducers 206.2, 8. The PTACs and Weather Anticipating Programmable Thermostats/Temperature Transducers are respectively installed in different rooms or zones of a multi-room or multi-dwelling indoor environment (e.g. hospitals, hotels, motels, senior housing facilities, condominiums, apartment buildings, schools and student dormitories).

The PTAC Weather Anticipating Programmable Controller 201.1, 2, 3, 4, 5, 6, 7, 8 each monitor the room/zone temperature in a respective room or zone with the respective internal or external temperature transducer. The wireless transceivers within the PTAC Weather Anticipating Programmable Controller communicates with other devices and servers using wireless networks.

In this example (FIG. 2) the PTAC Weather Anticipating Programmable Controller 201.1, 2 communicate using the various Wi-Fi IEEE 802.11 specifications, the PTAC Weather Anticipating Programmable Controller 201.8, 7, 6, 5 communicate using the various IEEE 802.15.4 wireless network specifications, and the Weather Anticipating Programmable Controllers 201.3, 4 communicate using the various Wi-Fi IEEE 802.11 and various IEEE 802.15.4 wireless network specifications. PTAC Weather Anticipating Programmable Controller 201.3, 4 also act as a bridge between the Wi-Fi IEEE 802.11 and IEEE 802.15.4 wireless networks. Each PTAC Weather Anticipating Programmable Controller is configured using a Wi-FI enabled device 120 through 231.1, 2, 3 or through the Status Interface Alarm Control Update Servers 260. In installations with multiple wireless access points/routers 221, 223 the PTAC Weather Anticipating Programmable Controller 201.1, 2, 3 will attempt to connect to the wireless access point with the strongest signal. Should PTAC Weather Anticipating Programmable Controller 201.3 be unable to connect to a wireless access point/router 223 through 233.1 it will attempt to connect to wireless access point/router 221 through 233.6, if PTAC Weather Anticipating Programmable Controller 201.3 is unable to connect to any of the wireless access points/routers then it will connect to another PTAC Weather Anticipating Programmable Controller (201.2 or 201.1) through (241.5/241.4) and PTAC Weather Anticipating Programmable Controller (201.2/1) will relay data to and from the PTAC Status Interface Alarm Control Update Servers 260. PTAC Weather Anticipating Programmable Controller 201.4 is out of range of the wireless access points/routers 221, 223 and connects through the PTAC Weather Anticipating Programmable Controller (201.3/2) with the strongest signal. Weather Anticipating Programmable Controller (201.3/2) than relays Weather Anticipating Programmable Controller 201.4 data to the PTAC Status Interface Alarm Control Update Servers 260. PTAC Weather Anticipating Programmable Controller 201.8, 7, 6, 5, 4, 3 use an IEEE 802.15.4 wireless mesh network 235.9, 8, 7, 6, 4, 3, 2, 1 to communicate and exchange data with PTAC Status Interface Alarm Control Update Servers 260 through the wireless data transceivers within Weather Anticipating Programmable Controller (201.3 or 201.4). All the PTAC Weather Anticipating Programmable Controllers receive software updates, operational settings and programming from internet based PTAC Status Interface Alarm Control Update Servers 260 through wireless access points. The wireless access points connect to the internet through a DSL, cable connection, fiberoptic or cellular connection 115.

The PTAC Weather Anticipating Programmable Controllers each contain a microcomputer system, input output interface and wireless transceiver. The microcomputer system includes a microprocessor, SRAM, and FLASH/EEPROM memory. In addition to a minimum of one digital temperature transducer, the PTAC Weather Anticipating Programmable Controllers can also interface with additional digital temperature transducers, room humidity transducer and water detector sensors.

The PTAC Status Interface Alarm Control Update Servers 260 obtain current and forecasted weather data from meteorological cloud servers 133. The PTAC Status Interface Alarm Control Update Servers 260 uses the weather data in the same manner described above in relation to the thermostat embodiment.

Current and upcoming occupancy data is obtained from room occupancy management systems including key card room access systems, hotel guest registries, hospital patient management systems is sent through 501 firewall through wireless connection wireless or wired connection 503/505.

The forgoing process performed by cooperation between the Status Interface Alarm Control Update Servers 139 and the Weather Anticipating Programmable Thermostat 101 in the first embodiment are likewise performed between each PTAC Weather Anticipating Programmable Thermostat and the PTAC cloud server in the second embodiment so as to control assigned hysteresis ranges, PID control algorithms, set points, and changeover taking into consideration current forecasted weather data from the meteorological server.

However, in addition to the factors (a)-(d) listed above in relation to the first embodiment, additional factors taking into account in the second embodiment include (e) current occupancy status, (f) upcoming occupancy schedule, and (g) start-up time delays.

Current and upcoming occupancy data can be obtained from room occupancy management systems including key card room access systems, hotel guest registries, hospital patient management systems, and other occupancy and alarm systems that store and/or monitor current and/or scheduled occupancy data for multi-room or multi-dwelling properties can also send room occupancy information to the PTAC cloud server. The PTAC Status Interface Alarm Control Update Servers uses the room occupancy information to reduce energy consumption by automatically changing the PTAC operational settings (hysteresis ranges, set points, changeover, etc.) depending on the occupancy status.

So in the second embodiment, in addition to the widening and narrowing of the variable hysteresis range based on the difference in indoor and outdoor temperature, the cooling or heating hysteresis range is also widened and narrowed depending on room occupancy or upcoming room occupancy status. If the room is unoccupied or going to be unoccupied then the hysteresis range is widened, allowing the room temperature to drift further above the cooling temperature set point in cooling mode, or further below the heating temperature set point in heating mode.

In the context of a hotel guest registry, in which room occupancy is scheduled in advance based on hotel guest bookings, or similarly in the context of a patient management system that includes pre-scheduled booking of a patient recovery or medical procedure room, the PTAC cloud server may readjust the variable hysteresis range to a normal occupancy setting a predetermined time in advance of a scheduled occupancy in order to pre-heat or pre-cool the room/zone into closer conformance with the set point temperature. So the system may use a wider hysteresis range for non-booked days of a hotel room, and then revert to a narrower hysteresis range at or shortly before a guest-specified or hotel-wide check-in time on the guest's scheduled day of arrival. Similarly, in the example of a hospital or other patient-care setting, similar pre-heating or pre-cooling of a patient's room or procedure room by narrowing of the hysteresis range may be performed based on a scheduled patient arrival date and time.

As outlined below, the same alarm condition determinations and notifications described for the first embodiment can be performed in the second embodiment.

The PTAC Weather Anticipating Programmable Controller and PTAC cloud server communicate on regular intervals, and so if communications between the PTAC Weather Anticipating Programmable Controller and PTAC cloud server should be interrupted or fail, the PTAC Weather Anticipating Programmable Controller will switch to failsafe mode and the PTAC cloud server will generate another alarm notification. During fail safe mode the PTAC Weather Anticipating Programmable Controller controls the set points, hysteresis ranges and changeover automatically at predetermined settings, i.e. independently of the outdoor weather conditions in view of the unavailability of up-to-date weather data.

Similarly, the PTAC Weather Anticipating Programmable Controller will automatically override any settings to prevent the room from exceeding a high or low temperature alarm threshold, and the PTAC server will accordingly send out an alarm notification to the authorized user(s). Again, the low temperature alarm threshold is particularly valuable if a current outdoor temperature acquired from the meteorological server by the PTAC cloud server is below freezing.

The PTAC Weather Anticipating Programmable Controller is preferably equipped with a tamper detector to determine if the cover is removed and sends a tamper alarm signal to the PTAC cloud server, which accordingly issues a corresponding alarm notification to the authorized user(s).

To prevent peaks in energy demands by multiple PTACs starting or running at once, the PTAC cloud server automatically staggers the start of individual PTACs during the initial start-up phase. For such purposes, each PTAC is assigned a different start-up time delay, i.e. a timed delay from the point at which a heating/cooling need is identified based on determination that the room/zone temperature is out of the desired temperature range, to the actual sending of an ON signal from the thermostat to the heating/cooling system. This way, if upon start-up of the system, multiple rooms or zones all have temperatures residing outside their desired temperature ranges, thus requiring heating or cooling operations, the PTAC Weather Anticipating Programmable Controllers activate the PTACs at different times to avoid power surges.

Building owners, property managers or authorized personnel hereafter referred to as users can access the PTAC cloud servers through internet enabled devices 112. The internet enabled devices include, cell phones, tablets, laptops or desktop computers. Time and dates for room occupancy can be programmed into the PTAC cloud server, or retrieved from external occupancy management systems as outlined above.

Connections through the internet are encrypted, for example using Transport Layer Security (TLS) cryptographic protocols. Users login through an encrypted portal to access the systems. Once logged in the users can monitor the operation, historical data and charts, change settings and configurations through Internet enabled devices. Various levels of system access are assigned to different users.

Alarm notifications are sent by email or text messages to a list of personnel that are responsible for operations. Contact info email and or text cell phone numbers are entered and updated on the PTAC Cloud Server through a web enabled device.

Each PTAC Weather Anticipating Programmable Controller may be installed within the PTAC enclosure with the direct to digital transducer mounted externally of the PTAC on a wall of the given room or zone, or the PTAC Weather Anticipating Programmable Controller may be mounted directly on the wall like a room thermostat.

Particular software code and algorithms for performing the described steps will be within the purview of the person of ordinary skill in the art upon a reading of the generally described steps outlined herein, and can accordingly be stored in computer readable memory of the thermostat, PTAC Weather Anticipating Programmable Controllers and cloud servers for execution by the respective processors thereof.

As described above, hysteresis, PID control and set point adjustment decisions made using data from the cloud server (current and forecast weather data, occupancy data, etc.) may be made either at the server or at the thermostat or PTAC Weather Anticipating Programmable Controllers. However, handling of at least some of these determinations at the server level may be preferable in view of efficiencies and advantages resulting from this particular configuration. For example, performing weather data comparisons at the PTAC cloud servers avoids the need to distribute the collected weather data to all PTAC Weather Anticipating Programmable Controllers, while the forwarding of the detected room temperature data to the server enables historical tracking, and handling of remote access and alarm notifications from a singular central point.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A heating and air conditioning control system comprising:
   a microcomputer-based unit with a wireless transceiver, outputs connected or connectable to a heating and air conditioning system to control operation thereof, including switching thereof between heating and cooling modes, and an input connected to a temperature transducer to measure a current indoor temperature in an indoor environment in which temperature is to be controlled by operation of said heating and air conditioning system;
   an internet access point; and
   one or more internet based meteorological HTTP web servers that provide current and forecasted weather data,
   wherein the microcomputer-based unit is configured to, automatically control operation of the heating and air conditioning system based on the current and forecasted weather data and the current indoor temperature relative to a desired set point temperature for said indoor environment, and automatically operate said heating and air conditioning system according to a variable hysteresis range that is adjusted to a narrower width under detection of greater differences between indoor and outdoor temperatures, and adjusted to a greater width under detection of lesser differences between indoor and outdoor temperatures.

2. The system of claim 1 wherein said microcomputer-based unit is configured to automatically switch said heating and air conditioning system between said heating and cooling modes based at least partly on said weather data.

3. The system of claim 1 wherein the micro-computer based unit is configured to run said heating and air conditioning system independently of said weather data in response to determination that the current indoor temperature is beyond a high or low temperature threshold.

4. The system of claim 3 further comprising at least one additional internet server separate and independent of the meteorological server, where said at least one additional server includes a server configured to send an alarm notification to one or more authorized users in response to said determination that the current indoor temperature is beyond a high or low temperature threshold.

5. The system of claim 1 wherein the micro-computer based unit is configured to operate in a failsafe mode in response to interruption or failure of communication between the micro-computer based unit and one or more internet servers, and to control the indoor temperature independently of the weather data within said failsafe mode.

6. The system of claim 5 wherein said one or more internet servers include a server configured to send an alarm notification to one or more authorized users in relation to initiation of the failsafe mode.

7. The system of claim 1 wherein said heating and air conditioning system is a package terminal air conditioning (PTAC) unit, and the micro-computer based unit is a PTAC Weather Anticipating Programmable Controller whose outputs are coupled to said PTAC unit.

8. A heating and air conditioning system comprising:
a plurality of package terminal air conditioning (PTAC) units;
a plurality of PTAC Weather Anticipating Programmable Controllers each comprising a microcomputer-based unit with a wireless transceiver, outputs connected or connectable to one of the PTAC units to control operation thereof, including switching thereof between heating and cooling modes, and an input connected to a temperature transducer to measure a current indoor temperature in an indoor environment in which temperature is to be controlled by operation of said one of the PTAC units;
an internet access point;
one or more internet based meteorological HTTP web servers that provide current and forecasted weather data; and
at least one additional internet server separate and independent of the one or more internet based meteorological HTTP web servers;
wherein:
each microcomputer-based unit is configured to, automatically control operation of said one of the PTAC units based on the current and forecasted weather data and the current indoor temperature relative to a desired set point temperature for said indoor environment; and
said plurality of PTAC Weather Anticipating Programmable Controllers define respective nodes in a wireless mesh network by which said plurality of PTAC Weather Anticipating Programmable Controllers are communicable with said at least one additional internet server via the internet access point.

9. The system of claim 8 wherein the plurality of PTAC units are respectively installed in different rooms, and said at least one additional internet server comprises or interfaces with a room occupancy management system from which an occupancy status of each room is retrievable by the at least one additional server, said at least one additional internet server being configured to automatically adjust operational settings of the respective PTAC Weather Anticipating Programmable Controller of each room depending on the occupancy status thereof.

10. The system of claim 9 wherein the room occupancy management system stores room occupancy schedule data, and the at least one additional internet server is configured to automatically adjust operational settings of the respective PTAC Weather Anticipating Programmable Controller of each room depending on the occupancy schedule data.

11. The system of claim 9 wherein the at least one additional internet server is configured so that adjustment of said operational settings includes offsetting a temperature at which the heating and air conditioning system is activated to a lower value for the heating mode and a higher value for the cooling mode in response to an unoccupied room status.

12. The system of claim 8 wherein said plurality of PTAC units are respectively installed in different rooms, and the PTAC Weather Anticipating Programmable Controllers have a start-up delay of different length from one another to stagger activation of said PTAC units at system start-up.

13. A heating and air conditioning control system comprising:
a microcomputer-based unit with a wireless transceiver, outputs connected or connectable to a heating and air conditioning system to control operation thereof, including switching thereof between heating and cooling modes, and an input connected to a temperature transducer to measure a current indoor temperature in an indoor environment in which temperature is to be controlled by operation of said heating and air conditioning system;
an internet access point; and
one or more internet based meteorological HTTP web servers that provide current and forecasted weather data,
wherein:
the microcomputer-based unit is configured to, automatically control operation of the heating and air conditioning system based on the current and forecasted weather data and the current indoor temperature relative to a desired set point temperature for said indoor environment; and
said one or more internet based meteorological HTTP web servers comprises a plurality of internet based meteorological HTTP web servers, and the system is configured to compare multiple weather data sets of respectively retrieved from said plurality of internet based meteorological HTTP web servers and filter out any of said multiple weather data sets that differ significantly from other data sets.

14. A computer-implemented method of controlling operation of a heating and air conditioning system, said method automatically obtaining current and forecasted weather data from one or more internet based meteorological HTTP web servers, automatically controlling operation of the heating and air conditioning system based on the current and forecasted weather data and a current indoor temperature of an indoor environment relative to a desired set point temperature for said indoor environment; wherein said one or more internet based meteorological HTTP web servers comprises a plurality of internet based meteorological HTTP web servers from which multiple weather data sets are respectively retrieved, the method comprises checking a need to heat or cool said indoor environment against the weather conditions, and checking said need comprises first filtering out any of any of said multiple weather data sets that differ significantly from other data sets, and selecting from among the remaining weather data sets as a source of weather conditions used for comparison against said need.

15. The method of claim 14 comprising controlling said heating and air conditioning system independently of said weather data if the current indoor temperature measures beyond a high or low temperature threshold.

16. The method of claim 14 comprising, in response to a communication failure with the meteorological server, controlling said heating and air conditioning system independently of the weather data.

17. A computer-implemented method of controlling operation of a heating and air conditioning system, said method comprising:

automatically obtaining current and forecasted weather data from one or more internet based meteorological HTTP web servers, automatically controlling operation of the heating and air conditioning system based on the current and forecasted weather data and a current indoor temperature of an indoor environment relative to a desired set point temperature for said indoor environment;

wherein controlling operation of the heating and air conditioning system comprises using a plurality of microcomputer based PTAC Weather Anticipating Programmable Controllers to respectively control a plurality of Package Terminal Air Conditioning (PTAC) units connected in a wireless mesh network and each connected to a respective temperature transducer measuring a respective room temperature, said mesh network being connected to at least one additional server via an internet access point, and said at least one additional server being configured to obtain the weather data from the one or more internet based meteorological HTTP web servers.

18. The method of claim 17 wherein the plurality of Package Terminal Air Conditioning (PTAC) units are respectively installed in different rooms, and the method comprises using room occupancy schedule data to automatically adjust operational settings of the respective PTAC Weather Anticipating Programmable Controller of each room depending on the occupancy schedule data.

19. The method of claim 17 wherein said one or more internet based meteorological HTTP web servers comprises a plurality of internet based meteorological HTTP web servers from which multiple weather data sets are respectively retrieved, the method comprises checking a need to heat or cool said indoor environment against the weather conditions, and checking said need comprises first filtering out any of any of said multiple weather data sets that differ significantly from other data sets, and selecting from among the remaining weather data sets as a source of weather conditions used for comparison against said need.

* * * * *